(12) United States Patent
Leverger et al.

(10) Patent No.: US 7,328,489 B2
(45) Date of Patent: Feb. 12, 2008

(54) FASTENER FOR FIXING A PANEL TO A SUPPORT AND PROVIDED WITH A HEAD COMPRISING A DEFORMABLE MEMBER

(75) Inventors: Eric Leverger, Epone (FR); Laurent Huet, Meru (FR)

(73) Assignee: I.T.W. De France, Beauchamp (FR)

( * ) Notice: Subject to any disclaimer, the term of this patent is extended or adjusted under 35 U.S.C. 154(b) by 192 days.

(21) Appl. No.: 11/139,682

(22) Filed: May 31, 2005

(65) Prior Publication Data
US 2006/0000064 A1    Jan. 5, 2006

(30) Foreign Application Priority Data
Jul. 2, 2004    (FR) .................... 04 07378

(51) Int. Cl.
*F16B 21/08* (2006.01)
(52) U.S. Cl. .................... 24/453; 24/292; 24/297; 403/408.1; 411/508; 411/510
(58) Field of Classification Search .................... None
See application file for complete search history.

(56) References Cited
U.S. PATENT DOCUMENTS 4,505,611 A * 3/1985 Nagashima et al. .......... 403/21
4,987,656 A * 1/1991 Sato ............................ 24/297
5,651,634 A   7/1997 Kraus
6,039,523 A   3/2000 Kraus
6,457,217 B2 * 10/2002 Yoshii et al. ................. 24/297
6,715,185 B2 *  4/2004 Angellotti ..................... 24/297

FOREIGN PATENT DOCUMENTS

DE    100 23 109 A1    11/2001

\* cited by examiner

*Primary Examiner*—Jack W. Lavinder

(57) ABSTRACT

A fastener for fixing a panel to a support is provided with a snapping-in foot adapted to contract elastically to enter a fixing orifice of the support. The fastener is further provided with a head having a plate, a hub, a shank and a deformable member, the plate and the hub being connected by the shank adapted to be received in a keyhole-shaped groove of the panel formed within the thickness of the panel in which the member and the hub are adapted to be received. The fastener also has a deformable rim including a plurality of arcs and deformable arms, each disposed between one of the arcs and the hub.

16 Claims, 4 Drawing Sheets

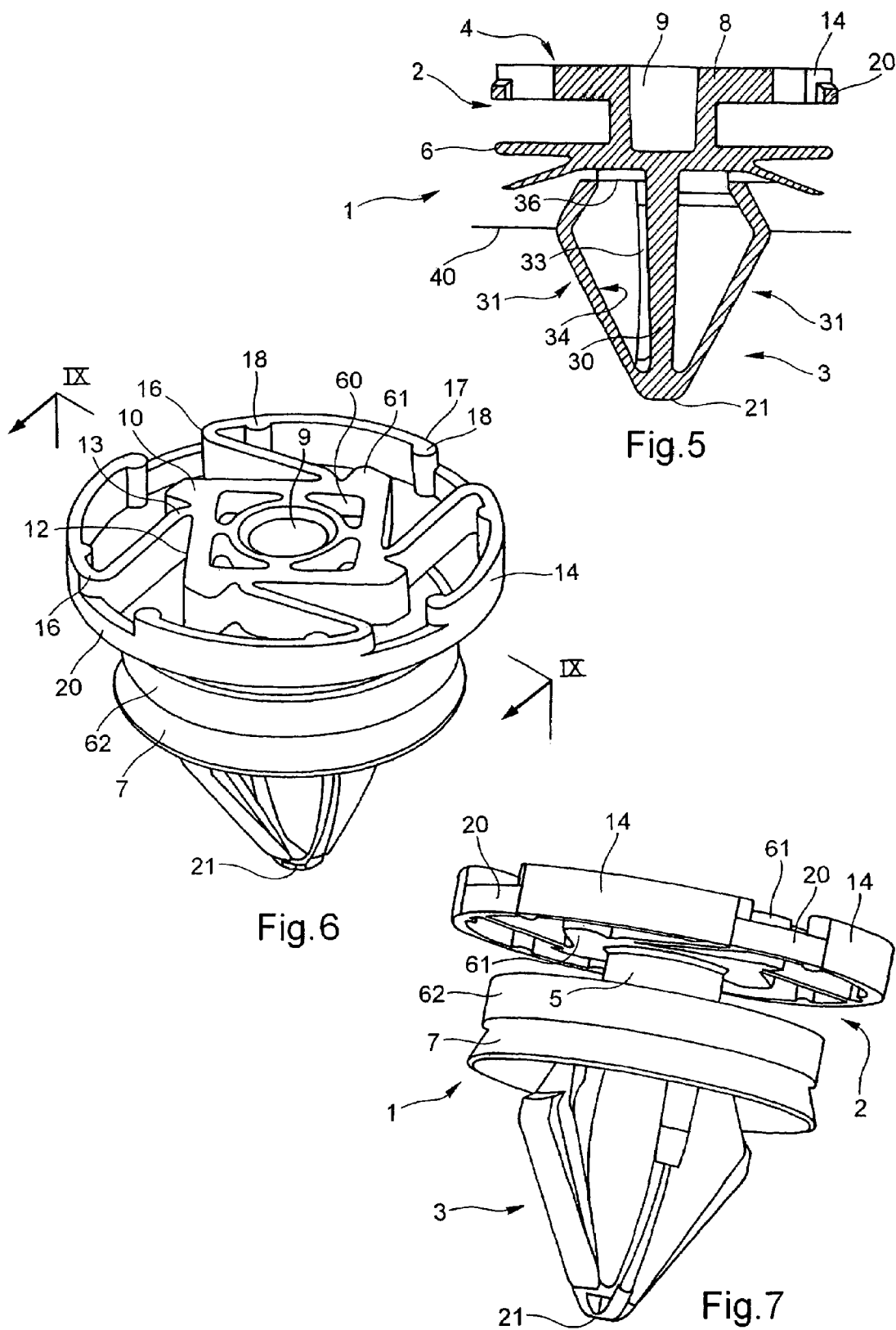

FASTENER FOR FIXING A PANEL TO A SUPPORT AND PROVIDED WITH A HEAD COMPRISING A DEFORMABLE MEMBER

RELATED APPLICATIONS

The present application is based on, and claims priority from, French Application Number 04 07378, filed Jul. 2, 2004, the disclosure of which is hereby incorporated by reference herein in its entirety.

FIELD OF THE INVENTION

The invention relates generally to fasteners for fixing a panel to a support such as a car body panel.

BACKGROUND OF THE INVENTION

There is known in the art a fastener provided with a snapping-in foot adapted to contract elastically to enter a fixing orifice of predetermined diameter of the support. This fastener is further provided with a head comprising a rigid plate, a rigid counter-plate, and a deformable flange. The plate and the counter-plate are offset axially and connected by a shank. The plate and the flange are also offset axially and connected by a shank.

The panel has a keyhole-shaped groove opening into a larger void and in which the flange and the counter-plate are placed, while the plate and the foot of the fastener remain outside the panel, the foot being adapted to be inserted into the orifice of the support.

The flange takes the form of a rigid rim attached to the center of the flange by curved arms. The arms have some flexibility, enabling the flange to deform when moving in the void.

To position the fastener in the panel, the head is pushed into the circular part of the groove until the flange is at the height of the void under the elongate part of the groove. The flange and the plate are then caused to slide in the void.

If the axis of the fastener is not perfectly transverse to the sliding motion, certain parts of the flange abut against surfaces of the void. The deformation of the flange means that it does not block the sliding movement.

Once the fastener is in position in the void, the flange relaxes and the fastener is recentered.

When fastening a panel to a support, the deformable flange allows the foot of the fastener to be inserted into an orifice in the support even if the latter is slightly offset relative to the geometry of the groove.

The smaller counter-plate is situated against one of the surfaces of the void and prevents the fastener being pulled out.

SUMMARY OF THE INVENTION

The invention aims to provide a fastener of the above type offering the possibility of cooperating with thin panels whilst at the same time being particularly simple and convenient to manufacture and use.

To this end, the invention proposes a fastener for fixing a panel to a support and provided with a snapping-in foot adapted to contract elastically to enter a fixing orifice of said support, said fastener being further provided with a head comprising a rigid plate, a rigid counter-plate, and a deformable member, said plate and said counter-plate being connected by a shank adapted to be received in a keyhole-shaped groove of said panel opening into a void formed within the thickness of said panel in which said member and said counter-plate are adapted to be received, which fastener is characterized in that it comprises a generally round chock having a hub, a deformable rim comprising a plurality of arcs and deformable arms each disposed between one of said arcs and said hub with said hub that forms said counter-plate whereas said arcs and said arms form said deformable member.

Thus the fastener includes a chock that both prevents pulling out and deforms to allow easy positioning.

According to features of the invention that are particularly simple and convenient both to manufacture and to use:

said hub is generally square and comprises four corners projecting with respect to said shank; and optionally
said hub has an edge surface on which four of said arms are rooted, each in the vicinity of one of said corners of said hub; and optionally
a first end of each of said arms is connected to one side of said edge surface and a second end of each of said arms is connected to a respective one of said arcs which extends generally facing said side whereas said arm is obliquely disposed between said side and said arc; and optionally
each of said sides comprises a toe extending in the direction of said rim, said toe being situated between said first end of said arm and said corner in the vicinity of said first end; and/or
said rim comprises, for each pair comprising two of said arcs having facing adjacent ends, a bridge extending between said adjacent ends; and/or
said fastener comprises a frustoconical skirt connected to said plate and flared in the direction therefrom toward said snapping-in foot; and/or
said head is formed in one piece with said body; or
said plate is extended by a peripheral ring from which extends a frustoconical skirt flaring therefrom toward said snapping-in foot, said ring and said skirt being molded onto said plate; and/or
said fastener is molded from a plastics material.

The invention also proposes an assembly intended to be fixed to a support, comprising a panel having at least one keyhole-shape groove opening into a void formed within the thickness of said panel and at least one fastener for fixing said panel to said support comprising a snapping-in foot adapted to contract elastically to enter a fixing orifice of said support, said fastener further comprising a head comprising a rigid plate, a rigid counter-plate and a deformable member, said counter-plate and said member being received in said void, said plate and said counter-plate being connected by a shank adapted to be received in said keyhole-shaped groove of said panel, and said plate being situated on an exterior surface of said panel comprising said groove, which assembly is characterized in that said fastener comprises a generally round chock having a hub and a deformable rim comprising a plurality of arcs and deformable arms each disposed between one of said arcs and said hub with said hub that forms said counter-plate whereas said arcs and said arms form said deformable member.

According to features of the invention that are particularly simple and convenient both to manufacture and to use:

the depth of said void substantially corresponds to the thickness of said chock; and/or
the depth of said groove substantially corresponds to the height of said shank; and/or
the keyhole-shaped groove has a circular portion and an elongate portion and said elongate portion of said groove has a width slightly less than the diameter of said shank at the junction with said circular portion and a width substantially equal to said diameter over the remainder of said elongate portion.

BRIEF DESCRIPTION OF THE DRAWING

The features and advantages of the invention will emerge from the following description, which is given by way of preferred but non-limiting example, and with reference to the appended drawings, in which:

FIG. 5 is a view in section taken along the line V-V in FIG. 3;

FIGS. 6 to 9 are similar to FIGS. 1, 2, 4 and 5, respectively, for a different embodiment of fastener, FIG. 9 being a view in section taken along the line IX-IX in FIG. 6.

DETAILED DESCRIPTION OF THE INVENTION

Figure 1:
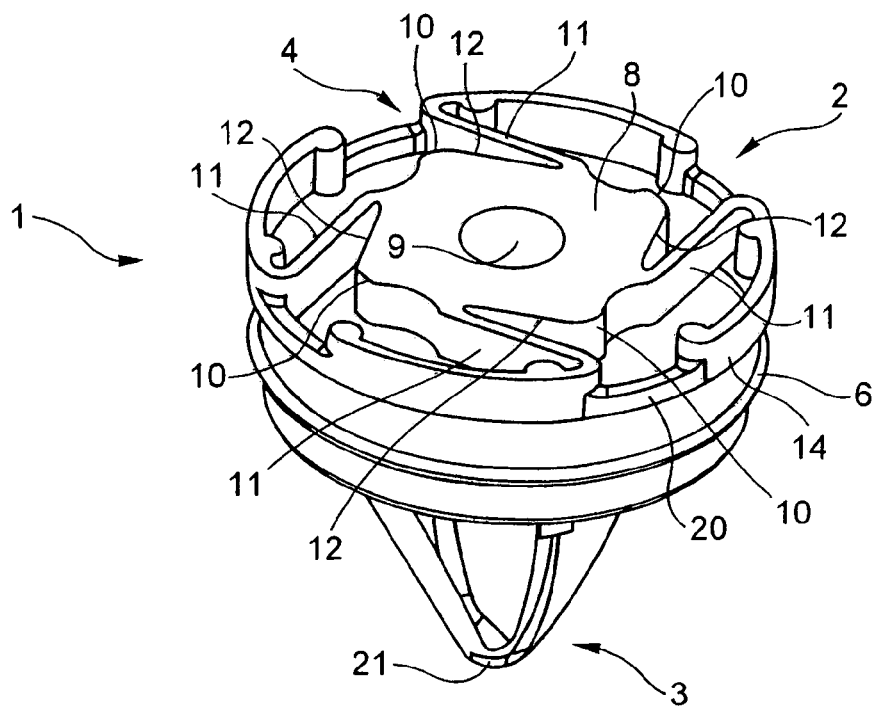
FIG. 1 is a perspective view of a fastener of the invention.
Figure 2:
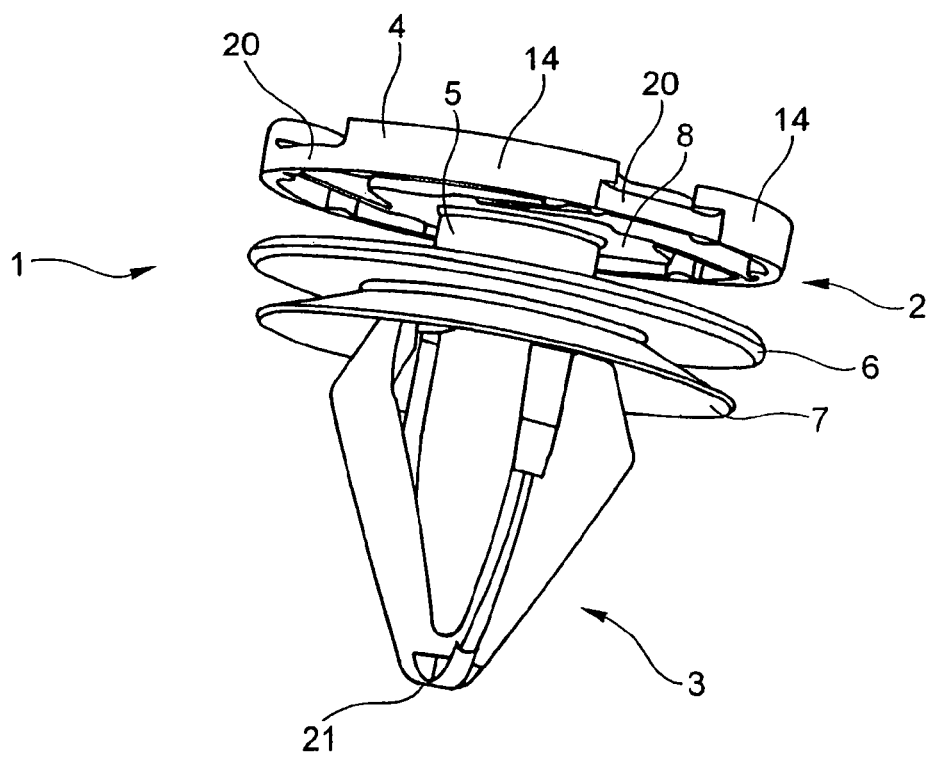
FIG. 2 is another perspective view of the fastener.
Figure 3:
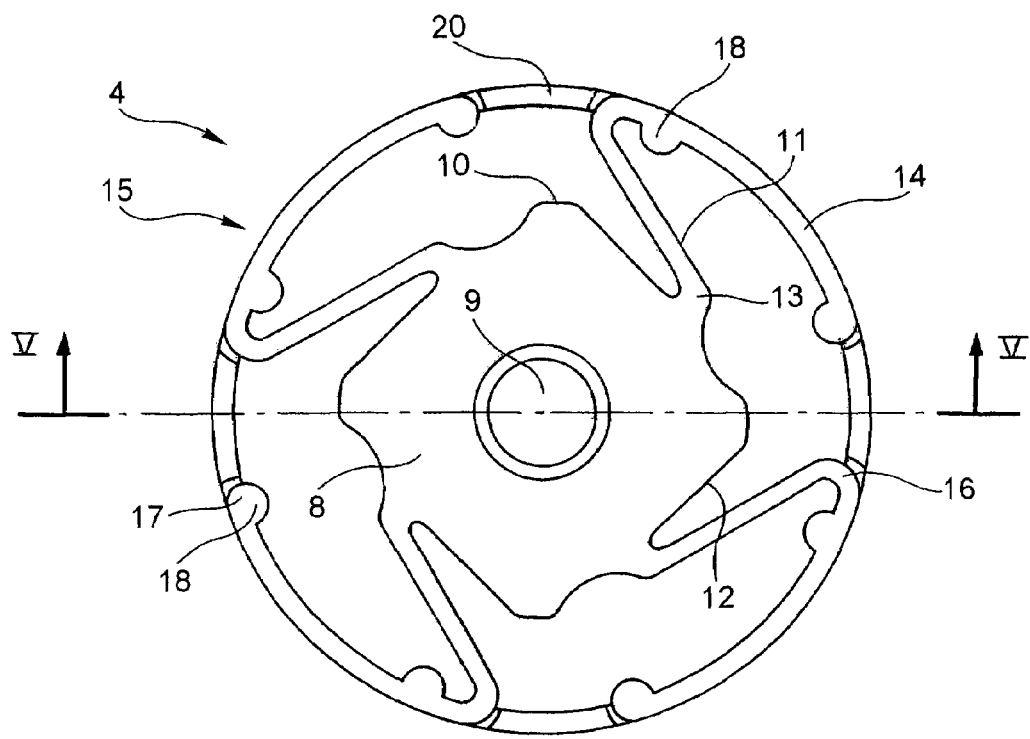
FIG. 3 is a view of the hub, the arms and the rim of the fastener.

The fastener 1 shown in FIGS. 1 to 5 is molded in one piece from a plastics material. It comprises a head 2 and a snapping-in foot 3.

The head 2 includes, starting from its end opposite the foot 3, a chock 4, a shank 5, a plate 6 and a sealing skirt 7, these various components being coaxial with each other and each having a generally circular shape.

The chock 4 includes a generally square hub 8. It extends around a central circular orifice 9. This orifice 9 is an extension of the hollow interior portion of the shank 5. The base 8 has four rounded corners 10. The chock 4 further includes four arms 11 each extending from one of the four sides 12 of the hub 8.

The arms 11 extend from the edge surface of the chock 4. The hub 8 and the arms 11 all have the same, generally constant thickness.

The chock 4 has quarter-turn symmetry of rotation, and there will be described in detail only one pair comprising a side 12 of the hub 8 and the corresponding arm 11.

In the vicinity of a rounded corner 10, the side 12 features a recess in the shape of a circular arc extended at the end opposite the corner 10 by the root 13 of the arm 11.

The arm 11 extends from the root 13 to an elbow 16 formed at the junction with an arc 14 that is part of a rim 15. Each arm 11 is extended by an arc 14. All the arcs 14 are identical and have a generally constant thickness equal to that of the arms 11.

In the direction away from the root 13, the arm 11 extends in rectilinear fashion as far as the elbow 16 and the angle between the arm 11 and the side 12 is a small acute angle.

The arc 14 is slightly rounded. The angle at the bend 16 between the arm 11 and the arc 14 is also an acute angle and of the same order of magnitude as the above angle. The end 17 of the arc 14 opposite the elbow 16 faces the corner 10. The arc 14 features two semicylindrical beads 18 forming ejection bosses. They are situated on the face of the arc 14 facing the side 12, one in the vicinity of the elbow 16 and the other at the end 17.

The thickness of the arm 11 and of the arc 14 is such that they have an overall stiffness. However, the arm 11 is flexible relative to the side 12 and the arm 11 and the arc 14 are flexible relative to each other.

The rim 15 is circular and is generally formed by the four arcs 14.

The arcs 14 are separated from each other but connected two by two by a bridge 20. Each bridge 20 extends from one end 17 of an arc 14 and the elbow 16 to the other end of an adjacent arc 14. The four bridges 20 are also in the shape of circular arcs so that they close the periphery of the chock 4. Each bridge 20 is half the thickness of the chock 4 and in the direction of this thickness each bridge extends from the face of the chock 4 adjacent the shank 5.

The thickness of the plate 6 is much less than the height of the shank 5 or that of the chock 4, which are substantially equivalent. On the other hand, the plate 6 and the chock 4 have substantially the same diameter.

The sealing skirt 7 extends from the face of the plate 6 opposite the shank 5. The skirt 7 is frustoconical, its height is comparable to that of the chock 4, and it is particularly thin.

The radius of the free edge of the skirt 7 is substantially the same as that of the plate 6, whereas the radius of the junction with the plate 6 is very much less.

The snapping-in foot 3 includes a flat core 30 and two curved wings 31 each extending from the flat core 30.

The core 30 is oriented in an axial plane and converges toward the free end 21 of the foot 3, which is pointed. The other end of the core 30 is connected to the head 2, to be more precise to the plate 6, on the side opposite the shank 5.

The wing 31 (FIGS. 4, 5) is connected to the core 30 along an edge surface 32 of the core 30 and has, facing the plane face 33 of the core 30, an internal surface 34 flanked by the face 33, a longitudinal edge surface 35 and a transverse edge surface 36 facing the face 6.

The internal surface 34 of the wing 31 is concave and in the present example has a profile that generally follows that of the external surface of the foot 3.

The foregoing description is equally valid for the second wing 31.

On respective opposite sides of a plane 40 of inflexion (FIG. 5) oriented transversely to the axial direction of the foot 3, the external surface of the latter tapers respectively toward the pointed end 21 of the foot 3 and toward the transverse edge surfaces 36 of the wings 31.

The external surface of the foot 3 has an edge (not visible) at the level of the plane 40 and having a generally oval shape.

Each wing 31 has a generally constant thickness, but with a slightly reduced thickness toward the longitudinal edge surface 35.

Figure 4:
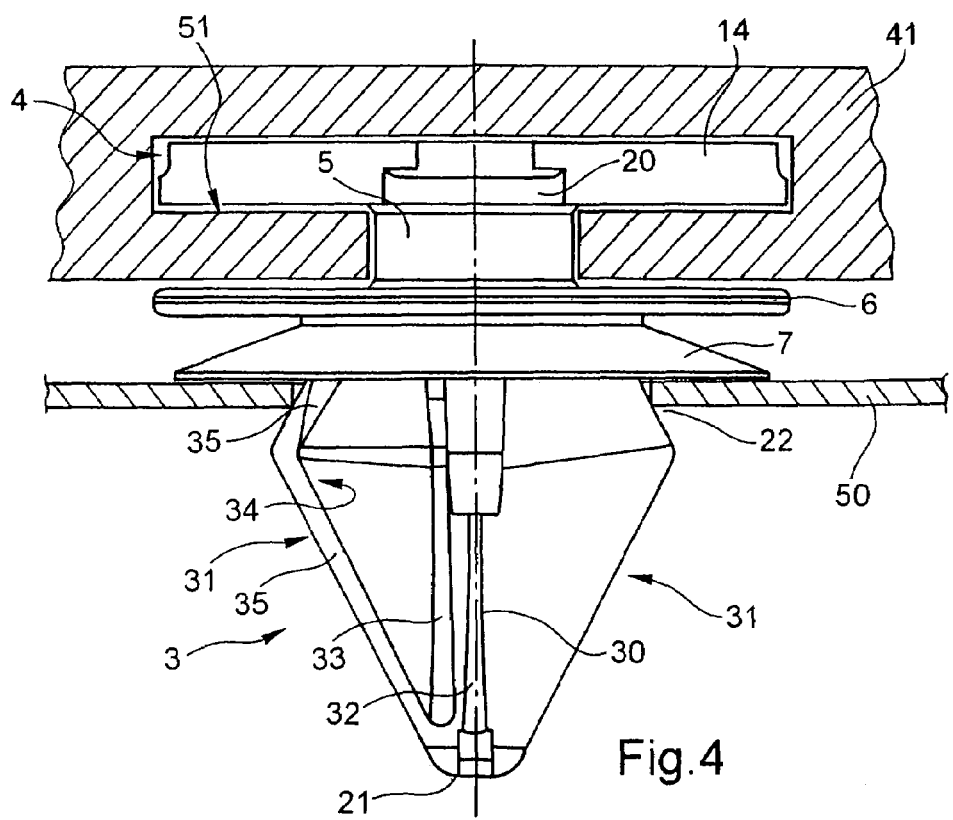
FIG. 4 is a profile view of the fastener in which the panel and the support with which the fastener cooperates are seen in section.
Figure 8:
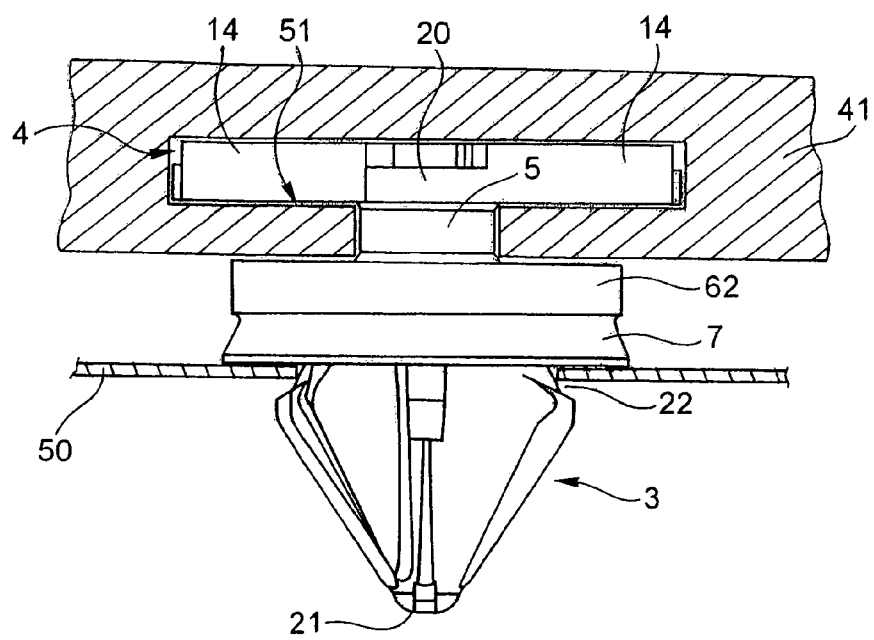
Figure 9:
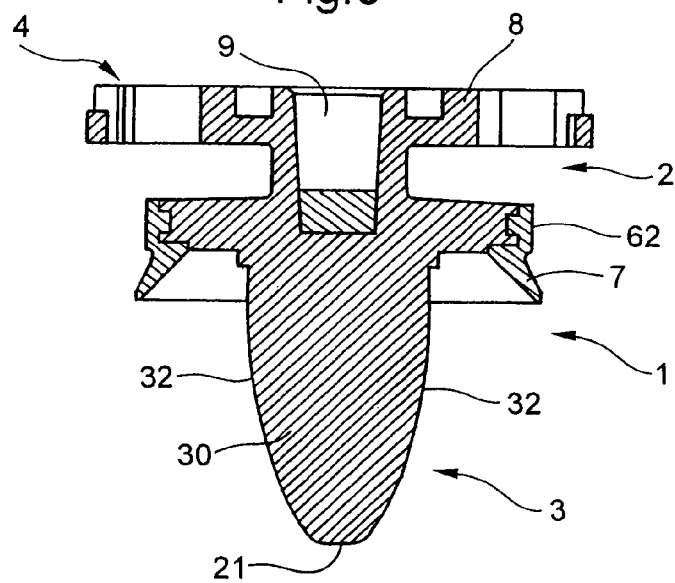
Figure 10:
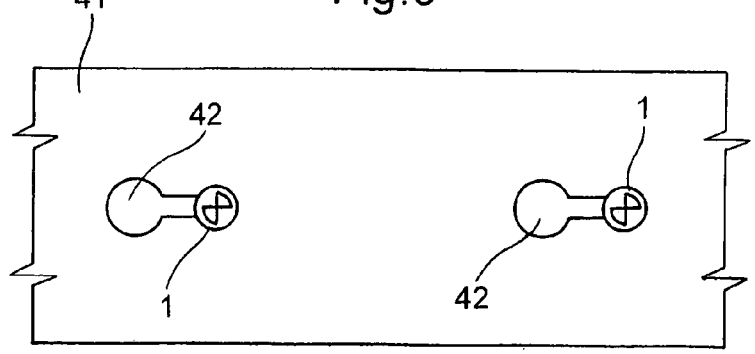
FIG. 10 is a diagrammatic view of an assembly of the invention.

The annular space situated around the shank 5 and between the chock 4 and the plate 6 is adapted to be received in a groove of a facing panel 41 such as an automobile body lateral embellisher (FIGS. 4, 10). In the present example the panel 41 includes a keyhole-shaped groove 42 whose circular portion has a diameter corresponding to that of the chock 4 and whose elongate portion has a width corresponding to that of the shank 5. The thickness of the wall of the panel 41 in which the elongate portion is formed corresponds to the height of the shank 5. The elongate portion opens into an void whose width substantially corresponds to the diameter of the rim 15 and whose thickness substantially corresponds to that of the chock 4. Thus the void opens at one end into the circular portion, the depth of the circular portion corresponding to the combined thickness of the elongate portion of the groove 42 and that of the void.

The elongate portion has a width slightly less than the diameter of the shank 5 at the junction with the circular portion and a width substantially equal to the diameter over the remainder of the elongate portion.

The chock 4 is fitted to the panel 41 by pressing the chock 4 into the circular portion until it is pushed far enough in to move in translation into the void under the elongate portion. Because of the reduction in the width of the groove 42 at the junction between the circular and elongate portions, the shank 5 has to be forced into the elongate portion of the groove 42. The fastener 1 is then slid toward the back of the elongate portion.

Ideally, the fastener 1 is offered up to the circular portion on the axis of the circular portion and slid parallel to the orientation of the elongate portion and transversely to the axis of the fastener 1. However, these operations are generally carried out in such a way that the axis of the fastener is rarely transverse to the sliding movement.

With the axis of the fastener 1 inclined to a transverse direction on sliding, the center of the chock 4 is offset from the middle of the void and the chock 4 is not flat in the void. In this position, the rim 15 is deformed, to a degree that depends on the inclination.

If the rim 15 necessitates a small deformation, only one arc 14 flexes, independently of the others. If the deformation is greater, the arm 11 flexes as well as the arc 14. In an extreme situation, the load is transmitted to an adjacent arm via a bridge 20.

Once positioned in the elongate portion, the fastener can be recentered since the arms 11 and the arcs 14 resume a relaxed position in which the axis of the fastener is transverse to the panel 41.

The fastener 1 is retained in the void by the ring 15, whose dimensions are adapted to immobilize the fastener 1.

The dimensions of the chock 4 are matched to those of the void, which avoids vibrations causing noise and the risk of the panel separating from the support. Despite the fabrication tolerances of the panel 41 and the fastener 1 and the geometry of the void, this matching is possible thanks to the presence of the deformable rim 15 and the deformable arms 11 on the chock 4.

The fastener 1 and the panel 41 thus form an assembly ready to be fixed to a support 50.

The support 50 (FIG. 4) to which the fastener 1 is to be fixed has a circular contour orifice 22 having a diameter less than the maximum radial dimension of the foot 3 (that maximum radial dimension is in the plane 40).

With the head 2 positioned in the panel, the foot 3 is forced into the orifice 22, with the tip 21 of the foot 3 first, cooperation between the perimeter of the hole and the portion of the wings 31 situated between the end 21 and the plane 40 having the effect of causing the wings 31 to flex progressively until this portion of the foot has passed through the orifice 22. The wings 31 relax, the effect of which is to entrain the foot 3 in the pressing-in direction until this results in abutment against the face of the support 50 situated on the side from which the foot 3 has been pressed in. The sealing skirt 7 is then pressed against the panel 50.

If the orifice 22 in the support 50 is not perfectly aligned with the groove 42, the latter must be inclined to insert it into the orifice 22. The chock 4 is then no longer flat in the void, and an arc 14 (and where applicable an arm 11) is (are) flexed to allow positioning of the fastener 1 in the panel and the support. This situation may arise in particular when using a panel and a support that must be fixed by means of more than one fastener 1.

Because the sealing skirt 7 is thin, the abutting engagement at the end of pressing in the foot 3 is obtained on the panel 41 rather than on the fastener 1.

The four corners 12 of the hub 8 provide resistance to pulling the panel 41 off the support 50 at four points. If traction is applied in the pulling off direction, the four corners 12 bear against an internal surface 51 of the panel 41 in the void with the result that the chock 4 cannot deform at the level of the hub 8 in this direction parallel to the axis of the fastener 1. Thus it cannot be pulled through the elongate portion of the groove 42 if excessive traction is exerted on the fastener 1. This resistance to pulling off is accentuated by the arms 11 and the rim 15. Those components are deformable, but each arm 11 and the associated arc 14 are relatively substantial around the hub 8, which limits their deformation in a direction parallel to the axis of the fastener 1. The chock 4 combines the function of preventing pulling out and the function of beneficial deformation, in particular when fitting the fastener into the panel and into the support.

To disengage the panel 41 from the support 50, a traction force is applied to the panel. The fastener 1 is not pulled out, thanks to the projecting corners 12. During this movement, the fastener 1 may be subjected to a force in the direction parallel to the axis of the fastener 1. It is generally subjected to successive forces in different directions so that the chock 4 is deformed, without breaking, as a function of these forces, in the same manner as described above. The foot 3 is then less able to resist pulling out and leaves the orifice 22 in the support 50 with a movement that is the reverse of that described above.

Then, if necessary, the fastener 1 is removed from the panel 41 by sliding the fastener 1 along the elongate portion of the keyhole-shaped groove 42.

Referring to FIGS. 5 to 9, in another embodiment, the fastener 1 has a hub 8, a plate 6 and a sealing skirt 7 each having a form different from that of the corresponding component in the embodiment described above. These differences do not modify the various properties and behaviors of the fastener as described above.

The hub 8 has four triangular orifices 60 regularly distributed around the central circular orifice 9. Instead of recesses in the shape of circular arcs, the hub 8 has four toes 61 projecting toward the facing arc 14. These toes project further relative to the shank 5 than the corners 12 and provide good resistance to pulling out.

The plate 6 is radially smaller than in the previous embodiment, and also thicker. The perimeter of the plate 6 bears on a peripheral ring 62 that is extended toward the foot by a sealing skirt 7 that is flared toward the foot 3. The skirt 7 is less flattened. The slope of the lateral surface of the skirt 7 is much more pronounced.

The ring 62 and the skirt 7 are molded onto the plate 6 in one piece from a plastics material. Thus a plastics material may be selected that is different from that forming the rest of the fastener 1. Particularly good sealing properties can be obtained in this way, if necessary.

In one variant of the system, the panel includes keyhole-shaped grooves including a notch transverse to the elongate portion, into which notch the fastener is wedged.

In another variant, the system includes a panel having a plastics material block fixed into an void of corresponding dimensions. The block features a keyhole-shaped groove adapted to receive the fastener.

Alternatively, the foot of the fastener has different wings.

More generally, other foot shapes for the fastener with a deformable chock as described are feasible.

The present invention is not limited to the embodiment described and shown and encompasses any variant execution thereof.

The invention claimed is:

1. A fastener for fixing a panel to a support, said fastener comprising:
   an elastic foot contractible and adapted to engage an orifice of said support; and
   a head comprising a plate, a hub, a shank and a deformable member, said plate and said hub being connected by the shank which is adapted to be received in a keyhole-shaped groove of said panel, wherein said deformable member and said hub are adapted to be received in a cavity inside the panel,
wherein said deformable member comprises:
   a deformable rim peripheral to the hub and comprising a plurality of arcs; and
   a plurality of deformable arms each disposed between one of said arcs and said hub; and
   said hub is generally square and comprises four corners projecting radially with respect to said shank.

2. The fastener according to claim 1, wherein said hub has side surfaces on which four of said arms are rooted, each said arm in the vicinity of one of said corners of said hub.

3. The fastener according to claim 2, wherein a first end of each of said arms is connected to the respective side surface and a second end of each of said arms is connected to a respective one of said arcs which extends generally facing said side surface whereas said arm is obliquely disposed between said side surface and said arc.

4. The fastener according to claim 3, wherein each of said side surfaces comprises a toe extending in the direction of said rim, said toe being situated between said first end of said arm and said corner in the vicinity of said first end.

5. A fastener for fixing a panel to a support, said fastener comprising:
   an elastic foot contractible and adapted to engage an orifice of said support; and
   a head comprising a plate, a hub, a shank and a deformable member, said plate and said hub being connected by the shank which is adapted to be received in a keyhole-shaped groove of said panel, wherein said deformable member and said hub are adapted to be received in a cavity inside the panel,
wherein said deformable member comprises:
   a deformable rim peripheral to the hub and comprising a plurality of arcs; and
   a plurality of deformable arms each disposed between one of said arcs and said hub; and
   said rim comprises, for each pair comprising two of said arcs having facing adjacent ends, a bridge extending between said adjacent ends.

6. The fastener according to claim 5, further comprising a frustoconical skirt connected to said plate and flared toward said foot.

7. The fastener according to claim 5, wherein said head is formed in one piece with said foot.

8. The fastener according to claim 5, further comprising: a peripheral ring and a frustoconical skirt, wherein said plate is radially extended by said peripheral ring from which extends the frustoconical skirt flaring toward said foot, said ring and said skirt being molded onto said plate.

9. The fastener according to claim 8, wherein in an axial direction, a thickness of said ring is equal to a length of said shank.

10. The fastener according to claim 5 being molded plastic product.

11. The fastener according to claim 5, wherein a thickness of said bridge in an axial direction of said fastener is less than that of said adjacent arc.

12. In combination, a support,
   a panel having at least one keyhole-shaped groove and a cavity formed within a thickness of said panel, and
   at least one fastener for fixing said panel to said support, said fastener comprising an elastic foot contractible and engaged with an orifice of said support in a fixed position when the panel is fixed by the fastener to the support, wherein
said fastener further comprises a head having a plate, a hub, a shank and a deformable member, said hub and said member being receivable in said cavity in the fixed position, said plate and said hub being connected by the shank which is slidable along said keyhole-shaped groove of said panel toward the fixed position, and in said fixed position said plate being situated on an exterior surface of said panel comprising said groove; said deformable member comprises:
   a deformable rim peripheral to the hub and having a plurality of arcs; and
   a plurality of deformable arms each disposed between one of said arcs and said hub; and
   said rim comprises, for each pair comprising two of said arcs having facing adjacent ends, a bridge extending between said adjacent ends.

13. The combination according to claim 12, wherein the depth of said cavity substantially corresponds to the thickness of said head.

14. The combination according to claim 12, wherein a depth of said groove substantially corresponds to a height of said shank.

15. The combination according to claim 12, wherein the keyhole-shaped groove has a circular portion and an elongate portion and said elongate portion of said groove has a width slightly less than the diameter of said shank at the junction with said circular portion and a width substantially equal to said diameter over the remainder of said elongate portion.

16. The combination of claim 12, wherein a thickness of said bridge in an axial direction of said fastener is less than that of said adjacent arc.

* * * * *